(12) United States Patent
Riubrugent

(10) Patent No.: US 6,952,992 B2
(45) Date of Patent: Oct. 11, 2005

(54) BATTER AND BREADING MACHINE

(76) Inventor: Narcis Garganta Riubrugent, Ctra, Bescano, 15, Pol. Torre Mirona, 17190 Salt (Girona) (ES)

( * ) Notice: Subject to any disclaimer, the term of this patent is extended or adjusted under 35 U.S.C. 154(b) by 0 days.

(21) Appl. No.: 10/305,122

(22) Filed: Nov. 27, 2002

(65) Prior Publication Data

US 2003/0097939 A1 May 29, 2003

(30) Foreign Application Priority Data

Nov. 28, 2001 (ES) ...................................... 200102890 U

(51) Int. Cl.⁷ .............................. A23L 1/00; A23L 1/22; A23G 3/00; A47J 44/00; B05C 19/00
(52) U.S. Cl. .............................. 99/494; 99/352; 99/407; 99/516; 118/13; 118/18
(58) Field of Search .......................... 99/485, 494, 516, 99/352–355, 403–407, 450.1, 450.2; 118/13, 16–18, 19, 20, 22, 24, 239, 257, 261, 423, 429, 308, 312, 621, 626; 198/715, 384, 659, 613, 580; 426/289, 292, 293, 295, 296, 94, 96, 99, 305, 519, 560, 443, 446; 452/111, 112, 113, 138

(56) References Cited

U.S. PATENT DOCUMENTS

| | | | | |
|---|---|---|---|---|
| 5,052,330 A | * | 10/1991 | Stacy ........................... | 118/16 |
| 5,238,493 A | * | 8/1993 | Miller ........................ | 99/494 X |
| 5,733,184 A | * | 3/1998 | Curry et al. ................. | 452/138 |
| 5,924,356 A | * | 7/1999 | Harper et al. ................. | 99/494 |
| 5,937,744 A | * | 8/1999 | Nothum, Sr. et al. .......... | 99/494 |
| 6,244,170 B1 | * | 6/2001 | Whited et al. ................ | 99/494 |
| 6,269,739 B1 | * | 8/2001 | Bettcher et al. .............. | 99/494 |
| 6,305,274 B1 | * | 10/2001 | Nothum, Sr. et al. .......... | 99/404 |

* cited by examiner

Primary Examiner—Timothy F. Simone
(74) Attorney, Agent, or Firm—Staas & Halsey LLP

(57) ABSTRACT

A batter and breading machine including a bedplate with an upper arm including a tank for food agglutinating, and a second area with a strangling to throw the battered or breaded ingredient of the product. The first and second areas have respective endless bands, driven by a plurality of rolls, to submerge the product in the tank and to take the product with agglutinating under the breaded strangling. The endless bands are driven by a motor with speed variation and each remove, respectively, the excess of breaded and battered agglutinating. The second endless band is fitted on its own chassis that is included in the chassis of the bedplate.

4 Claims, 5 Drawing Sheets

BATTER AND BREADING MACHINE

The present invention is directed towards a batter and breading machine, where meat products and other prepared foods are battered. With the present invention, the mechanical and hygienic characteristics of the machine are improved in that the components are streamlined and power consumption reduced.

BACKGROUND AND SUMMARY OF THE INVENTION

Breading machines are known that include a bedplate in which two areas are distinguished; a first area that forms a tank which it fills of glue or food agglutinating and where the product in question is introduced in order that it receives a bath and is impregnated of said food agglutinating, and a second area which upper part shapes a strangulation capable of driving the batter ingredient, such as breadcrumbs, which goes to the meat product or other prepared.

The first mentioned area has a first endless band, formed with metallic rods, suitable to take and to immerse the meat product or another one in the mentioned tank, as the first band ends at a second endless band, with a constitution similar to the first, arranged partially below the second area and leading to the product in question, already battered or breaded, towards the exit of the machine.

The first endless band has a configuration, substantially, in "V" appropriated, to enter in the own tank container of the agglutinating or similar, while the second band forms a substantially horizontal section towards the exit. Both endless bands are driven by a driven member, with speed variator, through respective power chains.

The same machine has two air blower organs driven by the same motor: an air blower located at the exit of the first band and the other one located on the second band in order to clear, respectively, the excess of battered and agglutinating from the meat product.

SUMMARY OF THE INVENTION

The machines previously described have several disadvantages. In the first place, the fact that the mentioned endless bands are driven by chains requiring a complicated detachment of such chains. Therefore, there is difficulty in the periodic disassembling of the same ones in order to carry out a good cleaning of these bands. Such operation is compulsory in components that continuously are in contact with food products which are susceptible to ferment if the due and precise cleaning is not observed.

There is an additional disadvantage, resulting from the fact that the second endless band is fitted on an only chassis, the one of the machine, which also makes difficult its periodic disassembling.

Another factor that represents an increase in the price of the machine is the need for two air blower organs to clear the excesses of battered and agglutinating and from the treated product.

All the mentioned disadvantages are solved in the present batter and breading machine. Indeed, in the batter and breading machine of the present invention, the advantage that the second endless band is fitted on a double chassis, makes it easier for the cleaning of the same one. Also the mentioned endless bands are driven by means of a gear system from which it is very easy to detach them in order to disassemble the corresponding band and to proceed with cleaning precisely and periodically.

The second endless band, instead of being invariably horizontal like in known machines, is capable of experiencing certain variations of layout in the exit zone of the machine, which it gives a certain versatility in the form to unload the treated meat product.

Another advantage of the present machine is economy of cost and electrical consumption, wherein the second air blower organ is replaced by rods that remove the leftover battered of the treated product. This, as well as it contributes the same effectiveness that in the previous machines, supposes the saving of mentioned the second air blower, which allows that the motor that drove both air blower can be of reduced power and, therefore, of smaller consumption.

These and other advantages will be appreciated better in the detailed description that it follows.

DESCRIPTION OF THE PREFERRED EMBODIMENTS

Figure 1:
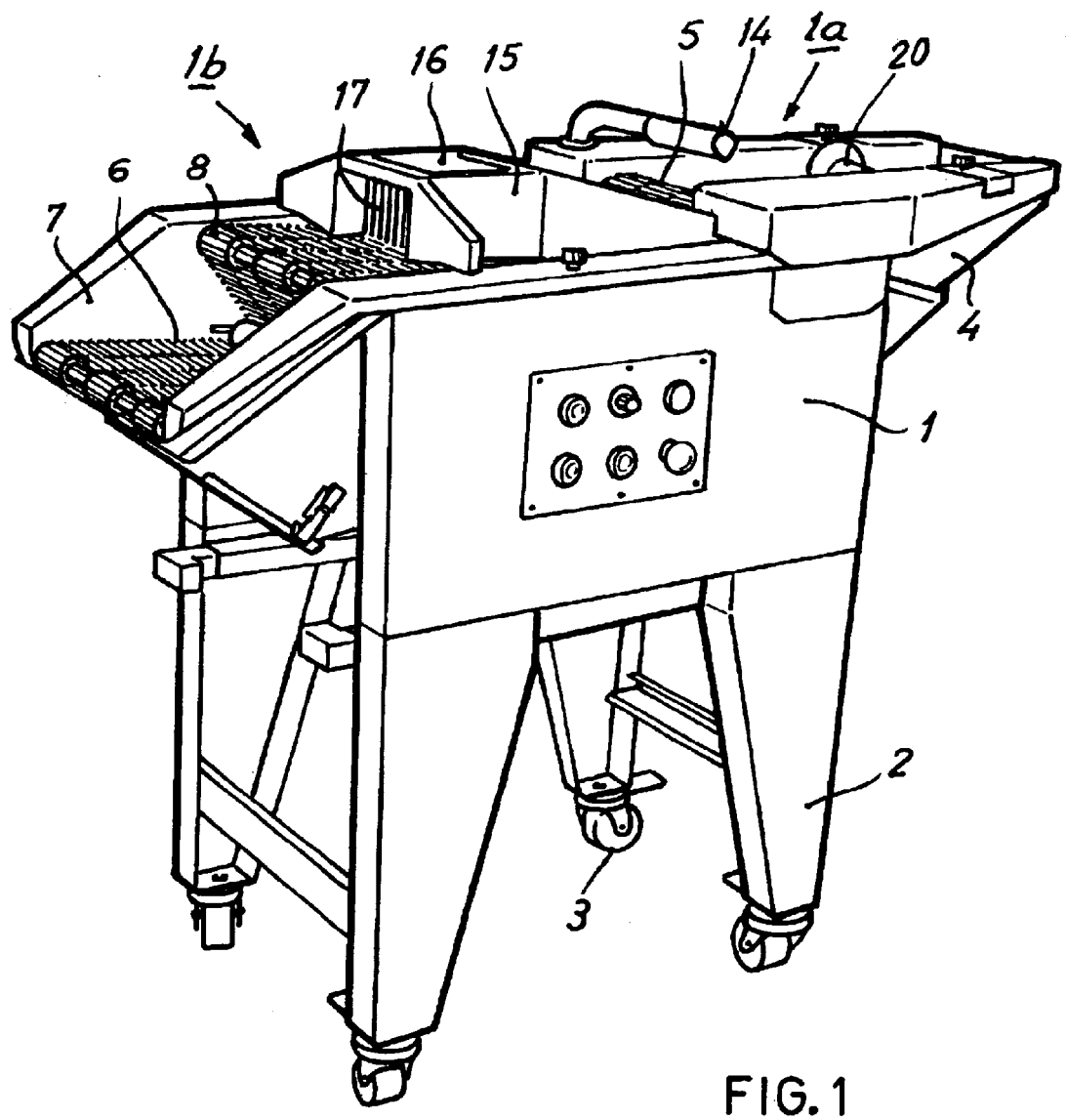
FIG. 1 represents a general view, and in perspective, of the present machine.

The improved batter and breading machine of the present invention (FIG. 1) comprises a body of bedplate 1 with legs 2 equipped with wheels 3 for possible movement, it being possible to distinguish in the same bedplate a rear area of gluing 1a and a front area of battered 1b.

In the area 1a or rear part of the machine, from where the meat or food product is introduced to be treated, there is a tank 4 that it is filled, like it is well-known, of glue or food agglutinating; and in that same tank 4 is housed a first endless band 5 that forms a general layout in "V" in order to enter the mentioned product in the same tank 4.

In the area 1b or front half of the machine there is a second endless band 6 that is fitted in an own chassis 7 that, as well, it is included in the chassis of bedplate 1 of the machine.

Figure 2:
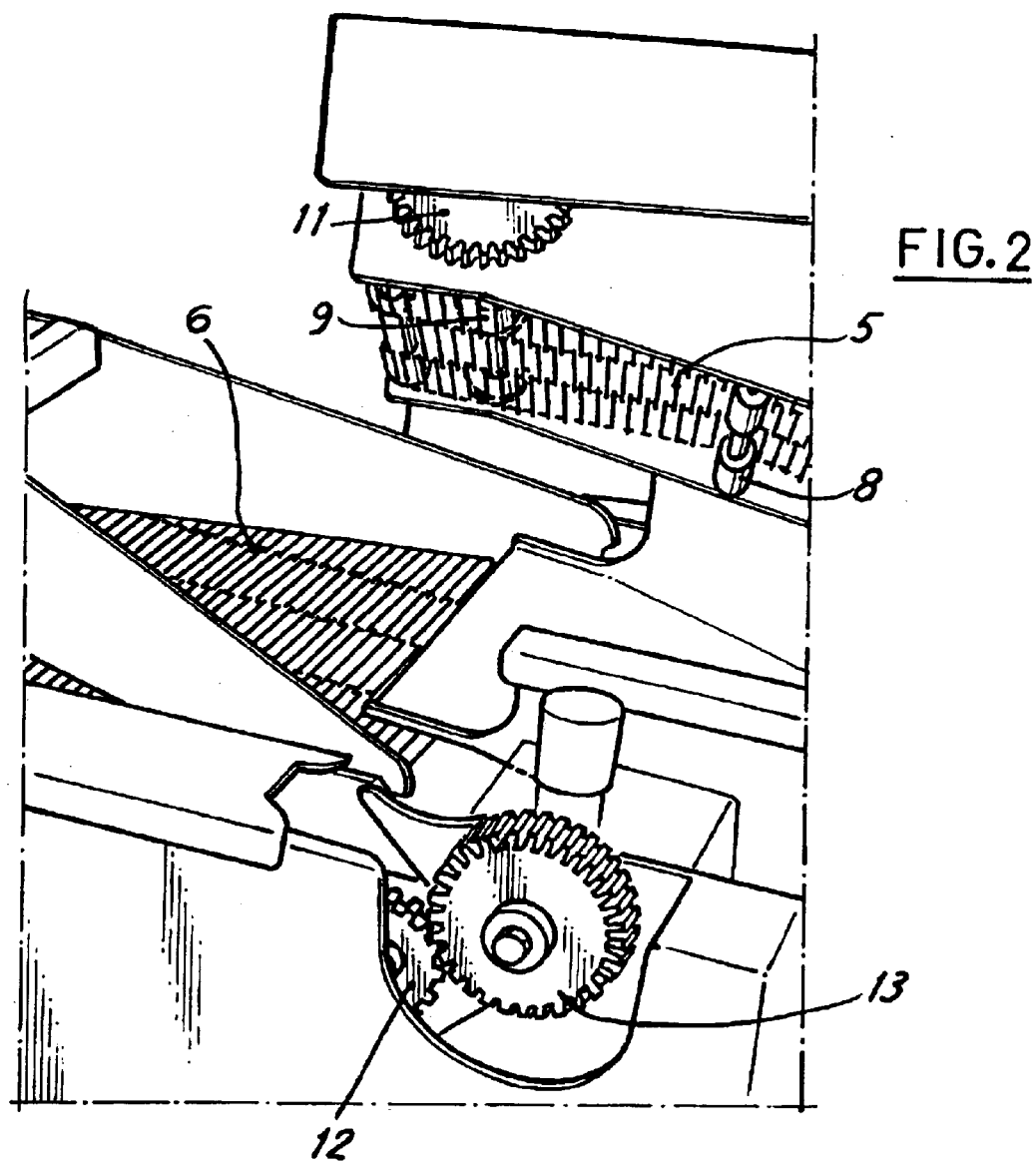
FIG. 2 illustrates, also in perspective, is an extended detail of the connection through gear means to drive the two endless bands, with one of them separated to the machine.
Figure 3:
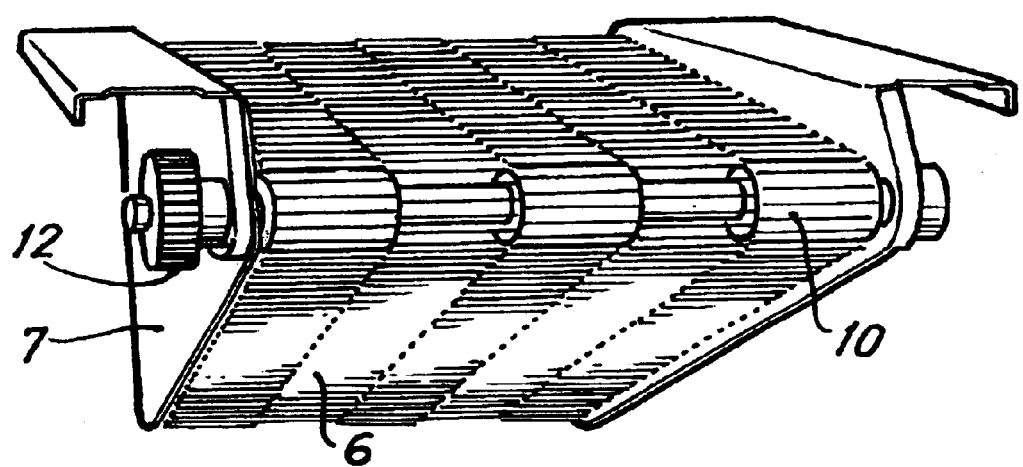
FIG. 3 is another perspective view that belongs to second endless band fully out of the machine.

Both endless bands 5, 6 are made of meshy constitution, as is well-known, and are equipped with a plurality of support rolls 8, 9, 10 (FIGS. 2 and 3). Support rolls 9 and 10 are laterally finished by a corresponding lateral pinions 11, 12 respectively that mesh with a gear wheel 13 that also receives the drive of the corresponding motor with speed variator (not shown). This, doubtlessly confers to the endless bands 5,6 a remarkable ease to remove them from the wheel 13 and to separate them from the machine in order to proceed to its cleaning, as it is illustrated in FIG. 2, in which it appears the first endless band 5 is totally separated, and in FIG. 3, that shows the second band 6 also separated too along with its own chassis 7.

Returning to the FIG. 1, and like it is well known, at the exit of the first endless band 5 there is an air blower tube 14 driven by a corresponding ventilator (not visible but like it is well known) whose air impulsion clears the excess of agglutinating that it is deposited over the product to be treated, while in the halfway area of the upper part of the machine, at the beginning of the second band 6, there is something similar to a "bridge" 15 whose upper part 16 is opened in order to be able to throw, through itself, the batterer or breader ingredient, as breadcrumbs, with the distinguishing feature that from the front part, or exit of this "bridge" 15, series of rods 17 are hanging, forming a curtain appropriate to touch with the product already battered (not illustrated) and to clear it the excess of battered or breading. This saves to install a second tube or air blower element, as well as to envisage a more powerful ventilator and a greater consumption.

Figure 4:
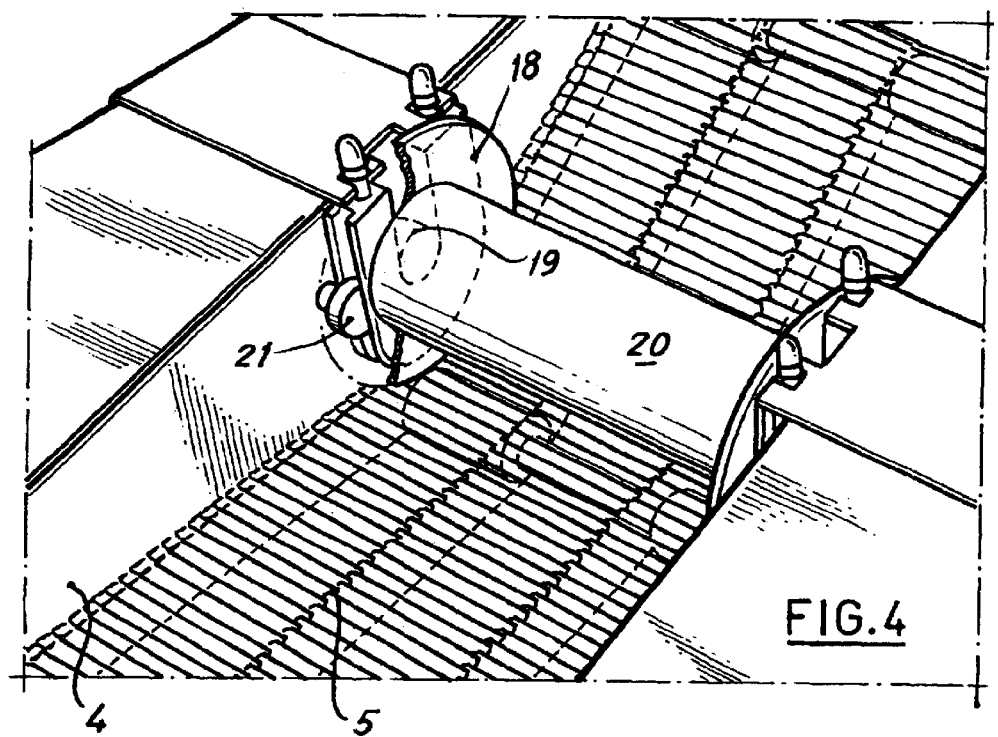
FIG. 4 illustrates a view of a tensor device of the first endless band.

On the other hand (FIG. 4) in order to maintain the mentioned configuration in "V" and its due tension of the first band 5, a pair of tensor elements has been envisaged in the present machine, one in each end of the edge of the dihedral angle that it forms the same band 5, constituted each one by a piece in "U" 18, as a horseshoe, in which piece is supported the respective trunnion 19 of a cross-sectional runner 20 to the same endless band 5, at the same time that the curved lower portion of each mentioned element 18 presses on the repeated band 5. And in order to regulate said pressure, the outer lateral rims of said tensor 18 are grooved and are capable of running by a corresponding wheel 21 installed in the respective lateral of that tank 4. Therefore, going up or down the same tensor in "U" 18 the tension granted to the band 5 is regulated.

Figure 5A:
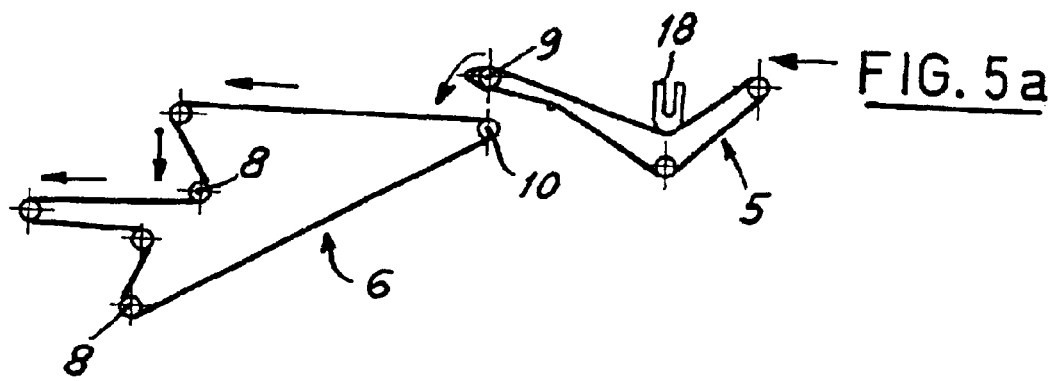
FIGS. 5a, 5b, 5c correspond to other diagrams that give a scheme of several settings of the circuit of the second endless band.
Figure 5B:
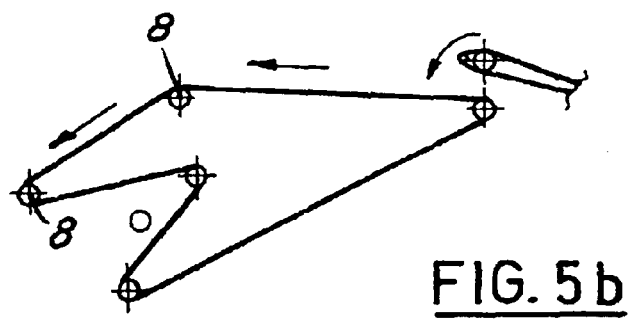
Figure 5C:
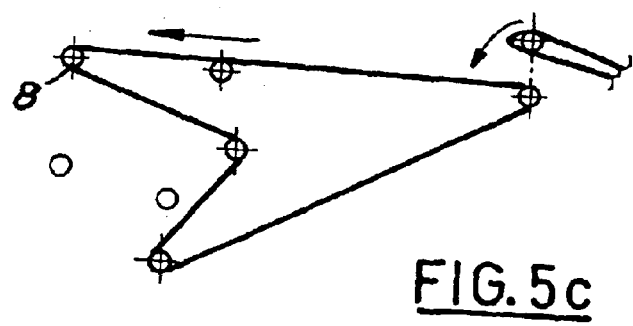

Finally, and returning again to the FIG. 1, it is possible to appreciate that the second endless band 6 is capable of adopting, in its front portion, several curves in order to influence the exit of the treated product, as it is outlined in the FIGS. 5a, 5b, and 5c, all this taking advantage of one turning points and putting out of action another turning points of the rolls 8 that go with the circuit of the same band 6. Therefore, the FIG. 5a outlines an exit example of the treated product in which this one, after running by a first section, substantially horizontal, falls to a second section of a lower level and equally horizontal, in order to cause in said falling an overturn of the mentioned product; in the FIG. 5b, however, the product runs by a first horizontal section and later it runs to a second inclined and remarkably descendent section. Finally, in accordance to the FIG. 5c said treated product leaves by a continuously horizontal section, all of them in accordance to the unloading necessities and the type of receiving organ of the same product (that it is not illustrated because it can be any of well known type and because, in addition, it is not an object of this invention).

The nature of the invention as well as its intrinsic advantages having been described, it is pointed out that the present batter and breading machine could be constructed in the most suitable form, in the most appropriate size and with the most convenient materials and more convenient means, being all of this within the spirit of the following claims.

What is claimed is:

1. An improved batter and breading machine, applicable to treat food products, comprising:

a bedplate comprising first and second upper areas, the first upper area to introduce the food products and being shaped as a tank to be filled with a food agglutinating, the second area to receive the food products having the food agglutinating from the first area and the first and second areas further comprising first and second endless bands respectively, and first and second rolls, the first endless band to submerge the products in the tank and the second endless band to take the food products having the agglutinating to be mixed with a breading agent;

a motor including a speed variator to drive the first and second endless bands;

first and second members to remove, respectively, excess agglutinating from the food products;

a chassis to receive the second endless band;

third and fourth rolls to respectively support the first and second bands, wherein the third and fourth rolls each include a pinion; and a plurality of gears driven by the motor to respectively mesh with the pinions to thereby drive the third and fourth rolls, wherein the second upper area comprises:

a cross-sectional bridge having an upper part to receive the breading agent; and a plurality of rods to receive the food products having the breading agent and brush the product having the breading agent to remove excess breading agent.

2. A machine in accordance with claim 1 further comprising an adjustable tensor unit to adjust a tension of the first endless band.

3. A machine in accordance with claim 1, further a wheel to move the tensor unit wherein the tensor unit comprises:

first and second U-shaped pieces on opposite sides of the tank to support the trunnion and press on the first endless band, the pieces comprising grooves on outer portions thereon to be moved by the wheel.

4. A machine in accordance with claim 1, further comprising a plurality of the second rolls fixed to several pivoting points of the chassis to define a plurality of curves in the second band.

* * * * *